(12) United States Patent
Takeuchi et al.

(10) Patent No.: US 7,704,450 B2
(45) Date of Patent: Apr. 27, 2010

(54) HIGH-PURITY FERROBORON, A MOTHER ALLOY FOR IRON-BASE AMORPHOUS ALLOY, AN IRON-BASE AMORPHOUS ALLOY, AND METHODS FOR PRODUCING THE SAME

(75) Inventors: Sunao Takeuchi, Futtsu (JP); Yuichi Sato, Futtsu (JP); Hiroaki Sakamoto, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 41 days.

(21) Appl. No.: 11/513,452

(22) Filed: Aug. 30, 2006

(65) Prior Publication Data

US 2006/0292027 A1 Dec. 28, 2006

Related U.S. Application Data

(62) Division of application No. 10/401,063, filed on Mar. 27, 2003, now abandoned.

(30) Foreign Application Priority Data

| Mar. 28, 2002 | (JP) | ................................. 2002-90649 |
| Mar. 28, 2002 | (JP) | ................................. 2002-90650 |
| Mar. 28, 2002 | (JP) | ................................. 2002-90651 |

(51) Int. Cl.
*C22C 38/06* (2006.01)
*C22C 38/14* (2006.01)
*C22C 45/02* (2006.01)

(52) U.S. Cl. ...................................... 420/121; 420/126
(58) Field of Classification Search .................. 420/121
See application file for complete search history.

(56) References Cited

U.S. PATENT DOCUMENTS

| 4,483,724 | A | * | 11/1984 | Hasegawa .................... 420/121 |
| 4,486,226 | A | | 12/1984 | Hildebrand et al. ............. 75/11 |
| 4,572,747 | A | | 2/1986 | Sussman et al. ................. 148/3 |
| 4,601,875 | A | * | 7/1986 | Yamamoto et al. ............. 419/23 |
| 4,617,052 | A | | 10/1986 | Takenouchi et al. ......... 420/117 |
| 5,322,113 | A | | 6/1994 | Shibuya et al. .............. 164/463 |
| 6,171,416 | B1 | * | 1/2001 | Aratani et al. .............. 148/643 |
| 6,273,967 | B1 | * | 8/2001 | Matsuki et al. ............. 148/304 |
| 6,635,361 | B1 | * | 10/2003 | Sugihara et al. ............. 428/667 |
| 6,808,678 | B2 | * | 10/2004 | Murakami et al. .......... 420/121 |

FOREIGN PATENT DOCUMENTS

| CN | 1083125 | | 3/1994 |
| CN | 1105393 | | 7/1995 |
| JP | 60-103151 | | 6/1985 |
| JP | 60116744 | A * | 6/1985 |
| JP | 60197830 | A * | 10/1985 |

* cited by examiner

*Primary Examiner*—George Wyszomierski
*Assistant Examiner*—Tima M McGuthry-Banks
(74) *Attorney, Agent, or Firm*—Kenyon & Kenyon LLP

(57) ABSTRACT

A high-purity ferroboron contains 0.02 mass % or more of P and 0.03 mass % or less of Al, with the balance Fe, B and unavoidable impurities. The high-purity ferroboron may further contain 0.03 mass % or less of Ti.

2 Claims, 1 Drawing Sheet

HIGH-PURITY FERROBORON, A MOTHER ALLOY FOR IRON-BASE AMORPHOUS ALLOY, AN IRON-BASE AMORPHOUS ALLOY, AND METHODS FOR PRODUCING THE SAME

The application is a divisional application under 35 U.S.C. §120 and 35 U.S.C. §121 of prior application Ser. No. 10/401,063 filed Mar. 27, 2003 abandoned. The entire disclosure of prior application Ser. No. 10/401,063 is considered part of this divisional application and is hereby incorporated by reference.

BACKGROUND OF THE INVENTION

1. Field of the Invention

The present invention relates to a high-purity ferroboron used as a raw material for an amorphous alloy or the like, and a mother alloy for an iron-base amorphous alloy using said ferroboron, an iron-base amorphous alloy by using said mother alloy, and methods for producing the same.

2. Description of the Related Art

An amorphous alloy is excellent in magnetic and mechanical properties and, as such, is viewed as a promising material for various industrial applications. An iron-base amorphous alloy, for example an amorphous alloy of an Fe—B—Si or Fe—B—Si—C system, is used, in particular, as a material for the iron core of a power transformer, a high frequency transformer and the like because it has a low core loss, a high saturation magnetic flux density and a high magnetic permeability.

An amorphous alloy of this kind is produced by rapidly cooling and solidifying a mother alloy in a molten state through a single-roll process, a twin-roll process or the like. Such a process is one wherein molten metal is rapidly solidified by spraying it through an orifice or the like onto the outer surface of a rapidly rotating metal drum and, by so doing, a thin strip or a fine wire is cast.

A mother alloy is an alloy the chemical composition of which has been adjusted to that of the amorphous alloy. In the case of an iron-base amorphous alloy as mentioned above, a mother alloy is produced by blending ferroboron, a diluent base iron, and auxiliary materials such as Si and C and, by so doing, adjusting the composition.

If impurities are contained in a mother alloy, an amorphous structure is not stably formed during rapid-cooling solidification and, as a consequence, excellent properties are not obtained. For this and other reasons, all the materials used as the raw materials for a mother alloy have been high-purity ones; electrolytic iron has been used as the diluent base iron.

Ferroboron has been produced in a melting-and-reducing furnace such as an electric furnace or the like using a boron source such as boron oxide, boric acid or the like, a base iron and a carbon-base reducing agent such as coke, charcoal, powdered coal or the like as the raw materials. In particular, electrolytic iron has been used as a base iron for high-purity ferroboron.

The content of boron in an iron-base amorphous alloy is several mass %, and two methods have been proposed as the production methods of the mother alloy thereof: a method of diluting ferroboron having a boron content of not less than 10 mass %, the ferroboron being produced through an electric furnace process; and the other method of finely adjusting the composition of ferroboron having a boron content of several mass %, the ferroboron being produced in a shaft furnace or a ladle refining facility. What is actually employed is the former method. The main reason for this is that the former method entails a high boron utilization efficiency and a low cost. Another reason is that, by the former method, the content of C can be lowered by increasing the content of B.

The solubility of C in ferroboron is in inverse correlation with the content of B: the lower the content of B, the higher the solubility of C. Therefore, in the case where C is harmful as an impurity, increasing the content of B is an effective measure for reducing the amount of C.

Japanese Unexamined Patent Publication No. S59-232250 discloses the above inverse correlation and a technology that makes it possible to commercially produce ferroboron having a B content of not less than 10 mass % and a C content of not more than 0.5 mass %. However, a problem in the technology disclosed therein is that, when ferroboron having a high boron content is produced through an electric furnace process, the electric power consumption rate is high.

In addition, Japanese Unexamined Patent Publication No. S59-126732 discloses a method of decreasing the content of C by bubbling oxygen gas through molten ferroboron. However, a problem of the method disclosed therein is that boron is also oxidized by the oxygen gas and therefore the boron utilization efficiency is decreased.

Further, as a production method for low-Al, high-purity ferroboron, Japanese Unexamined Patent Publication Nos. S59-232250 and 560-103151 disclose methods for obtaining ferroboron having a B concentration of 10 to 20 mass % using an electric furnace. However, when scrap iron is used as the base iron in each of the proposed methods, the concentration of Al contained in the scrap iron fluctuates and, as a consequence, the guaranteed Al content is less than 0.20 mass %. However, up to the present, commercially available low-Al, high-purity ferroboron has required a guaranteed Al content of less than 0.025 mass % and, to cope with the requirement, electrolytic iron has been used as the base iron in each of the methods and thus the product has been expensive.

As means of obtaining ferroboron for an iron-base amorphous alloy at a low cost, some methods are disclosed wherein a melting-and-reducing process that does not use an electric furnace is employed, although the ferroboron obtained has a low B concentration. For example, Japanese Unexamined Patent Publication No. S58-77509 discloses a method for obtaining ferroboron having a B concentration of several mass % by reducing iron ore and boron oxide simultaneously in a shaft furnace and Japanese unexamined Patent Publication No. S58-197252 discloses another method for obtaining ferroboron having a B concentration of several mass % by adding boron oxide and a reducing agent to molten steel and reducing the boron oxide in a ladle refining furnace.

In these methods, however, unreduced boron oxide remains in slag and, as a result, the boron utilization efficiency is low. Boron oxide is a comparatively expensive raw material, and therefore these methods entail a rather high cost. What is more, as the environmental regulations have been tightened in recent years, the methods have come to bear an increased cost since the disposal of boron-containing slag entails a high treatment cost. Thus, while the proposed methods are considered effective for lowering the content of Al, the cost reduction, which has been the initial object of the inventions, is not achieved. For this reason, these methods are not commercially applied at present.

On the other hand, today's mass-produced steel is produced through a continuous casting process because the process has a high productivity and entails a low cost. Killed steel is applied in order to suppress gas generation in a continuous casting process. Al is generally used as a deoxidizing agent for mass-produced steel and, as a result, a considerable amount of Al is contained in the steel. For this reason, mass-produced steel has been considered unusable as a base iron for a mother alloy of an iron-base amorphous alloy and for the high-purity ferroboron used as a raw material for a mother alloy.

However, some of mass-produced steel has come to be produced by using Si and Mn as deoxidizing agents and, besides, thanks to the advancements of refining technologies, steel having a low Al content can be mass-produced even by using Al as a deoxidizing agent.

On the other hand, Japanese Unexamined Patent Publication Nos. H9-263914 and 2001-279387 disclose methods for producing an inexpensive mother alloy by using steel obtained through an ordinary steelmaking process as a diluent base iron, instead of using electrolytic iron that is expensive. In these technologies, the alloy contains, in mass, P: 0.008 to 0.1%, Mn: 0.15 to 0.5% and S: 0.004 to 0.05% as impurities and such a trace amount of contained P can prevent the properties of a cast thin strip from deteriorating even though Mn and S are contained to the extents of the amounts within the above ranges, respectively.

Further, Japanese Unexamined Patent Publication No. 2002-220646 discloses a method, that is applied to a thin strip after casting, of producing an iron-base amorphous alloy thin strip capable of exhibiting excellent magnetic properties and small variations thereof even when the temperatures at various portions of an iron core vary over a wide temperature range during the annealing of the iron core, by actively adding P to an amount within a specific range to an alloy having a chemical composition within a limited range. In this alloy too, Mn and S can be contained to the extents of the amounts in the above ranges, respectively, and, thus, ordinary steel can be used as the diluent base iron.

SUMMARY OF THE INVENTION

An object of the present invention is to produce high-purity ferroboron at a low cost, with the efficiency in recovering boron from a boron source such as boron oxide improved and, in addition, with the content of C decreased. Another object thereof is to make it possible to use inexpensive mass-produced steel as a base iron instead of using expensive electrolytic iron and to produce a mother alloy for an iron-base amorphous alloy and an iron-base amorphous alloy, both the alloys having excellent properties, by using the ferroboron thus obtained as a raw material.

Yet another object of the present invention is to make it possible to stably supply ferroboron, the ferroboron being used, in particular, as a raw material or the like for an iron-base amorphous alloy containing P and having excellent magnetic properties, by adopting inexpensive mass-produced steel as a base iron instead of using expensive electrolytic iron. The gist of the present invention is as follows:

(1) A method for producing high-purity ferroboron by charging a boron source, a base iron and a carbon-base reducing agent into a melting-and-reducing furnace, characterized in that: the base iron is a steel produced using a refining furnace; and the Al content in said steel is 0.03 mass % or less.

(2) A method for producing high-purity ferroboron according to the item (1), characterized in that said melting-and-reducing furnace is an electric furnace.

(3) A method for producing a raw material for an iron-base amorphous alloy, characterized by adding a diluent base iron and auxiliary materials to high-purity ferroboron produced by a method according to the item (1) or (2).

(4) A method for producing a raw material for an iron-base amorphous alloy according to the item (3), characterized in that: said diluent base iron is a steel produced using a refining furnace; and the Al content in said steel is 0.006 mass % or less.

(5) A method for producing an iron-base amorphous alloy, characterized in that said iron-base amorphous alloy is produced by rapidly cooling and solidifying molten metal of a raw material for an iron-base amorphous alloy, the raw material being produced by a method according to the item (3) or (4).

(6) High-purity ferroboron characterized by containing
P: 0.02 mass % or more and
Al: 0.03 mass % or less, with the balance consisting of Fe, B and unavoidable impurities.

(7) High-purity ferroboron according to the item (6), characterized by containing Ti of 0.03 mass % or less.

(8) A method for producing high-purity ferroboron by charging a boron source, a base iron and a carbon-base reducing agent into a melting-and-reducing furnace, characterized in that: the base iron is a steel produced using a refining furnace; and said steel is that containing P of 0.02 mass % or more and Al of 0.03 mass % or less.

(9) A method for producing high-purity ferroboron according to the item (8), characterized in that the steel contains Ti of 0.03 mass % or less.

(10) A method for producing high-purity ferroboron, characterized in that the molten metal of ferroboron is decarburized by blowing oxygen gas through it while the temperature of the molten metal is 1,600° C. or higher after a production of the molten metal of ferroboron by melting-and-reducing furnace.

(11) A method for producing high-purity ferroboron according to the item (10), characterized in that said molten metal is that obtained by charging a boron source, a base iron and a carbon-base reducing agent into an electric furnace and then melting and reducing them.

(12) A method for producing high-purity ferroboron according to the item (10), characterized in that said molten metal is that obtained by remelting the ferroboron solidified after a boron source, a base iron and a carbon-base reducing agent are charged in an electric furnace and then they are melt and reduced.

(13) A method for producing high-purity ferroboron according to the item (11) or (12), characterized in that the B content in said molten metal is 10 mass % or less.

(14) A method for producing high-purity ferroboron according to any one of the items (11) to (13), characterized in that: said base iron is a steel produced using a refining furnace; and the Al content in said steel is 0.03 mass % or less.

(15) A method for producing a raw material for an iron-base amorphous alloy, characterized by adding a diluent base iron and auxiliary materials to high-purity ferroboron produced by a method according to any one of the items (10) to (14) and adjusting the chemical composition thereof.

(16) A method for producing a raw material for an iron-base amorphous alloy according to the item (15), characterized in that: said diluent base iron is a steel produced using a refining furnace; and the Al content in said steel is 0.006 mass % or less.

(17) A method for producing an iron-base amorphous alloy, characterized in that said iron-base amorphous alloy is cast by rapidly cooling and solidifying molten metal of a raw material for an iron-base amorphous alloy, the raw material being produced by a method according to the item (15) or (16).

DESCRIPTION OF THE PREFERRED EMBODIMENT

Figure 1:
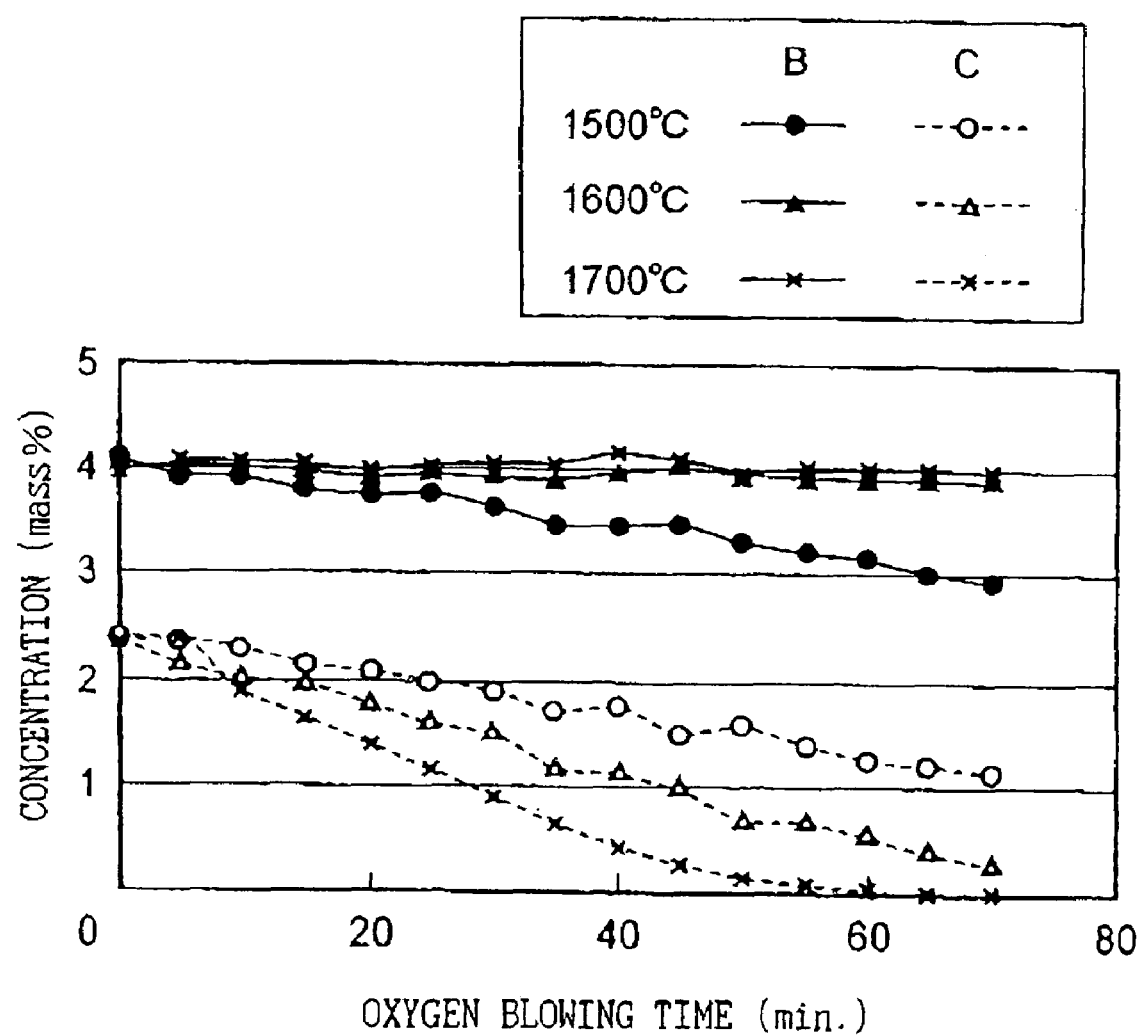
FIG. 1 is a graph that explains the methods according to the present invention.

In the production method of high-purity ferroboron according to the present invention, steel produced through an ordinary steelmaking process is used as the base iron that is one of the raw materials, and the Al content in said steel is 0.03 mass % or less. The other raw materials are a boron source such as boron oxide, boric acid or the like and a carbon-base reducing agent such as coke, charcoal, powdered coal or the like. These raw materials are charged into a melting-and-reducing furnace and ferroboron is produced. It is desirable from the viewpoint of productivity and cost to employ an electric furnace as the melting-and-reducing furnace.

By the method according to the present invention, because inexpensive mass-produced steel can be used as a base iron, it is possible to produce low-price ferroboron. A steel to be used may be a steel slab cast through a continuous casting process or the like after treated in a refining furnace such as a converter, an electric furnace or the like, or it may be a hot-rolled or cold-rolled steel sheet or the like. Even a steel deoxidized with Al can be used as a steel for a base iron as long as the Al content is 0.03 mass % or less. A steel that is deoxidized with Si and/or Mn and contains a small amount of Al may also be used.

According to test results, even when a steel that is deoxidized with Mn and has an Al content of 0.001 mass % is used as a base iron, there are cases where the Al content of the obtained ferroboron increases to somewhere around 0.02 mass % caused by the contamination from a reducing agent, etc. when high-purity ferroboron produced using a steel having an Al content of 0.03 mass % or less as a base iron is used as a raw material, an iron-base amorphous alloy excellent in magnetic and mechanical properties can be produced stably.

High-purity ferroboron obtained by a method according to the present invention can be used, besides the above, as a raw material for a magnetic material, an additive in a steelmaking process or the like.

Next, in the production method of a mother alloy for an iron-base amorphous alloy according to the present invention, a diluent base iron and auxiliary materials are added to high-purity ferroboron produced by the above method according to the present invention and the chemical composition thereof is adjusted. Using the invented method, it is possible to use mass-produced steel obtained by using a refining furnace in a steelmaking process as a diluent base iron, instead of using expensive electrolytic iron. In this case, it is desirable that the Al content in the steel be 0.006 mass % or less. The auxiliary materials are raw materials for the constituents, such as Si, C, etc., of an objective iron-base amorphous alloy. The high-purity ferroboron may be used in such a molten state as obtained by the above method or after melting one that is in a solid state. A high-frequency induction furnace or the like can be used for the melting.

The chemical composition of a mother alloy must substantially conform with that of an objective iron-base amorphous alloy. In the production of a mother alloy, raw materials of known chemical compositions must be blended so that a prescribed chemical composition may be obtained. According to test results, the analysis results of produced mother alloys deviate little from the prescribed chemical compositions defined beforehand.

In defining the chemical composition of a mother alloy, the compounding ratios of the raw materials must be specified regarding main components such as Fe, B, etc. Here, the content of Al must be specified so as to be equal to or less than the permissible amount that allows stably obtaining an amorphous alloy having excellent properties. In this case, since the Al content in high-purity ferroboron does not exceed 0.03% that is the maximum Al content of a steel used as a base iron, the Al content in a diluent base iron can be determined so that the Al content in a mother alloy may be equal to or less than said permissible Al amount by diluting the ferroboron with the diluent base iron.

According to test results, even when Al is contained in a steel as a diluent base iron, as far as its content is 0.006 mass % or less, most of objective iron-base amorphous alloys can stably secure excellent properties.

In the production method of high-purity ferroboron according to the present invention, the content of C is decreased while the content of B is not decreased, by blowing oxygen gas through molten metal of ferroboron and thus decarburizing it while the temperature of the molten metal is 1,600° C. or higher.

The present inventors earnestly studied the conditions for decreasing a C content without decreasing a B content in the method of blowing oxygen gas through molten metal of ferroboron having a high C content, through thermodynamic examinations and experiments and, as a result, worked out the present invention.

An Ellingham's Diagram is widely used for easily judging the degree of difficulty in reducing oxide, or conversely, the degree of difficulty in oxidizing a pure substance. In the diagram, the curves of B and C intersect with each other at approximately 1,900° K. At a temperature higher than this point, metallic B is more stable than C and C becomes CO; at a temperature lower than the point, C is more stable than B and B becomes boron oxide. In real situations, the temperature at the intersection of the curves at which the stability of the two substances is inverted depends on the activities of B and C in an Fe—B-C system and the partial pressures of oxygen and CO, and thus it is difficult to accurately determine the temperature thermodynamically.

Facing this situation, the present inventors established the above production method of ferroboron according to the present invention by determining the temperature at the intersection of the curves at which the stability of the two substances was inverted and defining the conditions applicable to actual operations through the experiments wherein real ferroboron molten metal was used.

In the above method according to the present invention, it is desirable that the molten metal of ferroboron be that obtained by melting and reduction in an electric furnace. The reason is that, in the above case, the utilization efficiency of expensive boron and the productivity are high. The molten metal may also be that obtained by remelting ferroboron once solidified after it has been produced in a molten state by melting and reduction in an electric furnace. Remelting is useful when a type of ferroboron that requires low C content and another type thereof are produced from an identical molten metal.

In an electric furnace process, when a B content in molten metal is high, the electric power consumption rate increases and, if a B content exceeds 10 mass %, the electric power consumption rate sharply increases. Therefore, it is desirable that a B content in molten metal be 10 mass % or less.

High-purity ferroboron according to the present invention may contain P by 0.02 mass % or more as well as Al by 0.03 mass % or less, as stated earlier. In addition, it may contain Al by 0.03 mass % or less and Ti by 0.03 mass % or less. The present invention does not specify the content of B, but ordinary ferroboron available in the market contains B by 10 mass % or more, and this level of B content is acceptable.

In the case where ferroboron is used as a material for an iron-base amorphous alloy, the content of B is diluted by the addition of auxiliary materials such as Si, and, for this reason, the B content of the ferroboron must be higher than that of the objective amorphous alloy. However, in the case where the objective alloy is of an Fe—B—Si—P system having a comparatively low B content, a B content of 5 mass % or higher in the ferroboron is acceptable. Further, ferroboron is used as a raw material for producing an amorphous alloy having a high B content and, as other applications, it is used also as an auxiliary material for steelmaking and a raw material for a magnetic material. Therefore, from the commercial viewpoint, it is more desirable that the B content be 10 mass % or more for suppressing inventory costs and allowing its use for these various applications.

The content of P must be 0.02 mass % or more. When ferroboron is produced through an electric furnace process, P is mixed in the ferroboron also from a boron source such as boron oxide and a reducing agent such as charcoal, and, as a result, it is observed that the P content in the product ferroboron is a little higher than that in the base iron as seen in Example 1 that is described hereinafter. In the case of employing an electric furnace process, however, a base iron accounts for the largest weight fraction among the raw materials, and P mixed in from the other raw materials is limited to a small amount. The amount of P inevitably mixed in ferroboron when electrolytic iron is used as a base iron is generally in the range from 0.005 to 0.019 mass %. For this reason, the P content in ferroboron according to the present invention is determined to be 0.02 mass % or more. The present invention does not specify an upper limit of the P content, but, generally speaking, it is 5 mass % or so, at the largest.

A content of Al up to 0.03 mass % is permissible. According to test results, in the production of an iron-base amorphous alloy to which P is actively added, as seen in Examples 2 and 3, the Al content in the mother alloy decreases even when Al is contained to the extent of the aforementioned amount in ferroboron, and, as a result, an amorphous alloy excellent in magnetic and mechanical properties can be obtained stably.

A content of Ti up to 0.03 mass % is permissible for the same reason. Ti may be contained together with Al, and an amount up to 0.03 mass % each is permissible.

Next, in the production method of ferroboron according to the present invention, a steel obtained through an ordinary steelmaking process is used as a base iron, and the contents of P, Al and Ti in said steel are regulated. As a refining furnace, a converter or an electric furnace can be employed. In addition, a steel produced through continuous casting is also acceptable.

P is an impurity element that significantly influences the properties of a steel, and there are two steel grades: a kind of steel produced by thoroughly dephosphorizing to a P content of less than 0.01 mass % several tens of ppm for instance; and the other kind of steel in which a P content of 0.01 mass % or more is permissible. The former requires a larger amount of slag than the latter for preventing rephosphorization which is a phenomenon wherein P once trapped in slag by forming oxide during oxidation refining returns thereafter into molten steel, and, as a result, the former involves a higher dephosphorization cost. For this reason, the kind of steel that is dephosphorized to a P content of less than 0.01 mass % is unsuitable for the purpose of the cost reduction of ferroboron. For this reason, a P content in a steel as a base iron is limited to 0.01 mass % or more. Then, as stated above, P is mixed in ferroboron also from other raw materials during the production of the ferroboron and the P content increases to 0.02 mass % or more.

Al and Ti are used as deoxidizing agents in the refining of steel, and they are added to some kinds of steel as necessary components. Even in ferroboron produced by using low-Al steel deoxidized with Si and/or Mn as a base iron, the Al content increases caused by the contamination from other raw materials. In contrast, in ferroboron produced by using Al deoxidized steel containing Al by 0.03 mass % as a base iron, it is confirmed that the Al content decreases a little. The same tendency is observed with regard to Ti. For this reason, the present invention specifies that each of the tolerable limits of Al and Ti contents in a steel used as a base iron is 0.03 mass %.

Next, in the production method of an iron-base amorphous alloy according to the present invention, molten metal of a mother alloy produced by the above method according to the present invention is cast through a rapid-cooling solidification process. The molten metal of a mother alloy may be that obtained by remelting a mother alloy in a solid state using a high-frequency induction furnace or the like, or otherwise, it may be a another alloy in a molten state as produced through the above process.

By the method according to the present invention, it is possible to cast a thin strip of an iron-base amorphous alloy, for example, of an Fe—B—Si—C-P system, the thin strip having an Al content of 0.005 mass % or less. The thin strip thus produced will prove to have excellent magnetic properties.

As a rapid-cooling solidification process, a single-roll process, a twin-roll process or the like can be employed.

Example 1

Each of the four kinds of base irons shown in Table 1, boron oxide and a carbon-base reducing agent were melted in an electric furnace and ferroboron was produced. Each of the base irons was the steel produced by subjecting pig iron obtained through a blast furnace to a desulfurizing process, a desiliconizing process and then a dephosphorizing and decarburizing process wherein oxygen blowing was applied in a converter. Steel A was deoxidized with Si and Mn, steels B and D with Mn, and steel C with Al. Each of the steels was cast into a steel slab through continuous casting, thereafter the steel slab was hot-rolled to a hot-rolled coil about 3 mm in thickness, and then steel pieces cut out from the hot-rolled coil, to the size of several centimeters square using a shear, were charged into an electric furnace.

As the electric furnace, a 3-phase Héroult electric furnace having an electric capacity of 600 kvA was used. The furnace was continuously operated for eight days, during which the base irons were changed every other day in the sequence of steels B, D, A and C. The tapping interval was about two hours and the ferroboron tapped at a timing not influenced by the switching of the base irons was subjected to analysis.

With regard to the blend of the raw materials, the initial blend shown in Table 2 was adopted at the start of the furnace operation and, at the time when the furnace operation was stabilized, the blend was switched to the stable state blend shown in the same table.

The analysis values of the ferroboron thus produced are shown in Nos. 1 to 4 of Table 3.

In the ferroboron produced by using steels A, B and D having the low Al contents as the base irons, the Al contents increased caused by the contamination of Al from the reducing agents, but the Al contents did not exceed 0.03 mass %. In the ferroboron produced by using steel C having an Al content of 0.03 mass % as the base iron, the Al content decreased a little because Al was trapped in the slag. Note that "T. Al" in the tables represents the total amount of metallic Al and compound Al.

Every one of the ferroboron Nos. 1 to 4 in Table 3 contained Al as an impurity, but its amount was 0.03 mass % or less. As a result of producing mother alloys using these types of ferroboron as raw materials and then casting the mother alloys into iron-base amorphous alloys, the thin strips having excellent properties as described later were obtained in all the cases.

Example 2

Next, an example wherein ferroboron was produced using an induction melting furnace is explained. Steel A shown in Table 1 as the base iron: 950 g, CaO as the slag forming agent: 20 g, and a carbon material as the reducing agent: 300 g were charged into a crucible, heated in an induction furnace and held therein at 1,700° C. Then, boron oxide: 600 g was added to the mixture in the crucible from the upper portion thereof and then the mixture was held therein again at 1,700° C. The induction heating was stopped after an elapse of 60 min. from the time when the boron oxide was added, and the ferroboron obtained after cooling the mixture was analyzed. The result is shown in No. 5 of Table 3.

The amount of impurity in this ferroboron was sufficiently low with respect to either Al or Ti. Here, the B content was lower and the C content was higher in this ferroboron compared with the ferroboron Nos. 1 to 4 that were produced using an electric furnace. However, this ferroboron can be used as a raw material of a mother alloy for an iron-base amorphous alloy by combining the ferroboron with another ferroboron having a high B content and a low C content or by a similar measure.

Example 3

Each of the ferroborons No. 1 to No. 4 in Table 3 obtained in Example 1, a diluent base iron, and, as the auxiliary materials, FeP, a carbon material and Si were melted in a high-frequency induction furnace and an Fe—B—Si—P system mother alloy for an iron-base amorphous alloy was produced. Each of the ferroborons was used after crushing one tapped and then solidified in Example 1. Steels A to D in Table 1, which were used in Example 1, were used here as the diluent base irons.

The raw materials were blended so that the main chemical components of a mother alloy would conform to prescribed values, heated until they were melted completely in a high-frequency induction furnace, and held therein until the mixture became homogeneous. Then, the mixture was solidified and crushed, and a part of it was sampled for analysis.

The examples of the material blends in the case where ferroboron FeB-A of No. 1 in Table 3 was used as a raw material are shown in Table 4. Here, the mother alloy A-A is the example of the case where steel A was used as the diluent base iron, and the mother alloy A-C is the example of the case where steel C was used as the diluent base iron.

The analysis values of the components of the mother alloys obtained in the examples of the blends are shown in Table 5. It was confirmed that the analysis values of the main components in Table 5 hardly deviated from respective prescribed values defined beforehand and that the same chemical compositions as those intended for the blends of the raw materials were obtained.

In the mother alloy A-A, the Al content as an impurity was 0.0050 mass % or less, and thus the mother alloy was suitable as a raw material for an iron-base amorphous alloy. In the mother alloy A-C, on the other hand, the Al content was high and the Ti content was also high, and thus the mother alloy was unsuitable as a raw material for an iron-base amorphous alloy.

In the cases where steels A, B and D were used as the diluent base irons, the Al contents of the produced mother alloys were 0.0050 mass % or less for all the cases where the ferroborons No. 1, No. 2, No. 4 and No. 5 in Table 3 were used, and any of the mother alloys was suitable as a raw material for an iron-base amorphous alloy. In the cases where steel C (No. 3) was used as the diluent base irons, on the other hand, the Al content of any of the produced mother alloys was high, and any of the mother alloys was unsuitable as a raw material for an iron-base amorphous alloy.

Example 4

The mother alloy A-A in Table 5 obtained in Example 3 was remelted and a thin strip was produced by rapidly cooling and solidifying the molten mother alloy using a single-roll method. Then, the magnetic properties of the thin strip as a material for an iron core were evaluated. As a result of analyzing the chemical composition of the thin strip, the chemical composition did not deviate from that of the mother alloy. Note that, in the case where the chemical composition of the mother alloy was adjusted by further adding auxiliary materials at the time of the remelting, too, the same chemical composition as that intended for the blend of the raw materials was obtained.

In the evaluation of magnetic properties, the thin strip was cut in a length of 120 mm, annealed at 360° C. for one hour in a nitrogen atmosphere while a magnetic field was imposed thereto and, then, $B_{80}$ and core loss were measured using a single sheet magnetic tester (SST). Here, $B_{80}$ was the maximum magnetic flux density when the maximum applied magnetic field was 80 A/m, and the core loss was measured when the maximum magnetic flux density was 1.3 T. The frequency at the measurement was 50 Hz.

As a result of the measurement, a high magnetic flux density of $B_{80}$=1.44 T was realized and the core loss was as low as 0.063 W/kg, and, thus, the thin strip proved to have excellent alternate current soft magnetic properties and to be applicable sufficiently to actual use.

TABLE 1

| | Component (mass %) | | | | | | |
|---|---|---|---|---|---|---|---|
| Steel | Fe | C | Si | Mn | P | S | T.Al | Ti |
| A | Bal. | 0.0033 | 0.7660 | 0.2550 | 0.0334 | 0.0051 | 0.0040 | 0.0003 |
| B | Bal. | 0.0026 | 0.0050 | 0.4300 | 0.0120 | 0.0190 | 0.0010 | 0.0003 |
| C | Bal. | 0.0010 | 0.0100 | 0.1000 | 0.0050 | 0.0050 | 0.0300 | 0.0300 |
| D | Bal. | 0.0040 | 0.0040 | 0.3400 | 0.0160 | 0.0080 | 0.0010 | 0.0004 |

TABLE 2

| | Compounding ratio (in mass) | |
|---|---|---|
| Raw material | Initial | Stable state |
| Boron oxide | 657 | 657 |
| Base iron | 820 | 820 |
| Charcoal | 190 | 368 |
| Lime | 84 | 67 |
| Metallurgical coke | 214 | — |

TABLE 3

| No. | Ferroboron | Base iron | Component (mass %) | | | | | | | | |
|---|---|---|---|---|---|---|---|---|---|---|---|
| | | | Fe | B | C | Si | Mn | P | S | T.Al | Ti |
| 1 | FeB-A | A | Bal | 15.3 | 0.3500 | 0.8580 | 0.2400 | 0.0350 | 0.0090 | 0.0230 | 0.0060 |
| 2 | FeB-B | B | Bal | 15.5 | 0.3300 | 0.3500 | 0.4500 | 0.0180 | 0.0220 | 0.0240 | 0.0050 |
| 3 | FeB-C | C | Bal | 15.1 | 0.3700 | 0.4500 | 0.1800 | 0.0150 | 0.0070 | 0.0290 | 0.0310 |
| 4 | FeB-D | D | Bal | 15.7 | 0.3200 | 0.4200 | 0.3900 | 0.0240 | 0.0140 | 0.0240 | 0.0080 |
| 5 | FeB-A2 | A | Bal | 3.42 | 4.7800 | 0.7700 | 0.2100 | 0.0240 | 0.0036 | 0.0040 | 0.0003 |

TABLE 4

| | Compounding ratio (in mass) | |
|---|---|---|
| Raw material | Mother alloy A-A | Mother alloy A-C |
| FeB-A | 929 | 929 |
| Diluent base iron | 5665 | 5622 |
| FeP | 3300 | 3300 |
| Carbon material | 16.5 | 16.4 |
| Si | 90.2 | 133 |

TABLE 5

| Mother alloy | Component (mass %) | | | | | | | |
|---|---|---|---|---|---|---|---|---|
| | Fe | B | C | Si | Mn | P | S | T.Al | Ti |
| A-A | Bal | 1.4200 | 0.2450 | 1.4200 | 0.1550 | 5.9600 | 0.0050 | 0.0047 | 0.0011 |
| A-C | Bal | 1.4200 | 0.2430 | 1.4200 | 0.0840 | 5.9500 | 0.0050 | 0.0190 | 0.0180 |

Example 5

For the purpose of clarifying the lower limit temperature at which deboronization did not occur when low-C ferroboron was produced, oxygen-blowing tests were carried out using an induction melting furnace. Steel A shown in Table 6, ferroboron having a B content of 18 mass % and a carbon material were charged into a crucible and melted in an induction melting furnace. They were blended so that the initial weight of the molten metal would be 1,000 g and the initial composition would comprise a B content of 4.0 mass % and a C content of 2.4 mass %. The molten metal was held at three levels of temperatures, namely 1,500° C., 1,600° C. and 1,700° C., and pure oxygen gas supplied from the upper portion at a flow rate of one liter/min. Samples were taken from the molten metal at intervals of five minutes and subjected to chemical analyses.

FIG. 1 shows the changes of the contents of B and C in the molten metal relative to the oxygen supply time. At 1,500° C., B and C decreased simultaneously. Consequently, it was clarified that the temperature at which the thermodynamical stability of B and C was inverted was not far from 1,500° C.

At 1,600° C. and 1,700° C., while the decarburization proceeded, the B content stayed constant and the deboronizing reaction did not proceed.

Example 6

For the purpose of confirming that ferroboron having low contents of C and Al could be produced at a low cost, ferroboron was produced through an electric furnace process and subjected to oxygen supply.

Each of the four kinds of base irons shown in Table 6, boron oxide and a carbon-base reducing agent were melted in an electric furnace and ferroboron was produced. Each of the base irons was the steel produced by subjecting pig iron obtained through a blast furnace to a desulfurizing process, a desiliconizing process and then a dephosphorizing and decarburizing process wherein oxygen blowing was applied in a converter. Steel A was deoxidized with Si and Mn, steels B and D with Mn, and steel C with Al. Each of the steels was cast into a steel slab through continuous casting, thereafter the steel slab was hot-rolled to a hot-rolled coil about 3 mm in thickness, and then steel pieces cut out in the size of several centimeters square from the hot-rolled coil using a shear were charged into an electric furnace.

As the electric furnace, a 3-phase Héroult electric furnace having an electric capacity of 600 kVA was used. The furnace was continuously operated for 16 days. For the former eight days, ferroboron having a B content of 15 to 16 mass % was produced and the base irons were changed every other day in the sequence of B, D, A and C. For the latter eight days, ferroboron having a B content of 9 mass % or so was produced and the base irons were changed also every other day in the sequence of B, D, A and C. The molten metal of the ferroboron tapped from the electric furnace was poured into a ladle, held at 1,600° C. by high-frequency induction and subjected to oxygen supply.

The average operation conditions during the former eight days were as follows; voltage: 45 V, current: 4,000 to 5,000 A, tapping interval: a little shorter than two hours, daily output: 2 t/day, and electric power consumption rate: 4.3 kWh/kg-FeB. The average operation conditions during the latter eight days were as follows; voltage: 45 V, current: 4,000 to 5,000 A, tapping interval: a little longer than an hour and a half, daily output: 2.2 t/day, and electric power consumption rate: 3.9 kWh/kg-FeB.

The analysis results of the ferroboron before the oxygen supply are shown in Table 7 and those after the oxygen blowing in Table 8. The C contents were decreased by the oxygen blowing in all the specimens. In addition, the subsidiary effect was confirmed that the contents of Al and Ti were also decreased by the oxygen blowing. Note that "T. Al" in the tables represents the total amount of the metallic Al and the compound Al.

From this example, it is understood that the effect of oxygen gas blowing on the reduction of a C content is applicable to molten metal of ferroboron supplied from an electric furnace. Note that any of the steels A to D produced through a converter process can be adopted as a base iron used in an electric furnace process. Besides the above, from the figure of an electric power consumption rate per product weight, it is understood that the lower B concentration in ferroboron is more advantageous in terms of electric power cost.

Example 7

The present inventors confirmed that, even if ferroboron obtained through an electric furnace process was once solidified after tapping, the ferroboron could be decarburized by remelting it and blowing it with oxygen gas. In fact, the eight types of ferroboron obtained in Example 6 as shown in Table 7 were remelted, held at 1,600° C., and subjected to oxygen gas blowing. In this case too, it was possible to decrease the C content in ferroboron to 0.1 mass % or less without lowering the B content therein.

Example 8

For the purpose of confirming that the ferroboron produced by the method according to the present invention was suitable for producing a mother alloy for an iron-base amorphous alloy and also for producing an iron-base amorphous alloy, mother alloys were produced by adding diluent base irons and auxiliary materials to ferroboron.

Each of the ferroboron obtained in Example 6, a diluent base iron, and, as auxiliary materials, FeP, a carbon material and Si were melted in a high-frequency induction furnace and an Fe—B—Si—P system mother alloy for an iron-base amorphous alloy was produced. Each of the ferroboron was used after crushing that tapped and then solidified in Example 6. Steels A to D in Table 6 were used as the diluent base irons.

The raw materials were blended so that the main chemical components of a mother alloy would conform to prescribed values, heated until they were melted completely in a high-frequency induction furnace, and held therein until the mixture became homogeneous. Then, the mixture was solidified and crushed, and a part of it was sampled for analysis.

The examples of the material blends in the case where ferroboron FeB-A9-O in Table 8 was used as a raw material are shown in Table 9. Here, the mother alloy FeB-A9-O-A is the example of the case where steel A was used as the diluent base iron, and the mother alloy FeB-A9-O-C is the example of the case where steel C was used as the diluent base iron.

The analysis results of the components of the mother alloys obtained in the examples of the blends are shown in Table 10. It was confirmed that the analysis values of the main components in Table 10 were little deviated from respective prescribed values defined beforehand and that the same chemical compositions as those intended for the blends of the raw materials were obtained.

In the mother alloy FeB-A9-O-A, the Al content, as an impurity, was low, and thus the mother alloy was suitable as a raw material for an iron-base amorphous alloy. On the other hand, in the mother alloy FeB-A9-O-C wherein steel C having a high Al content was used as the diluent base iron, the Al content was high and the Ti content was also high, and thus the mother alloy was unsuitable as a raw material for an iron-base amorphous alloy.

In the cases where steels A, B and D were used as the diluent base irons, the Al contents of the produced mother alloys were 0.0050 mass % or less for all the cases where the ferroboron in Table 8 was used, and any of the mother alloys was suitable as a raw material for an iron-base amorphous alloy. In the cases where steel C was used as the diluent base irons, on the other hand, the Al content of any of the produced mother alloys was high, and any of the mother alloys was unsuitable as a raw material for an iron-base amorphous alloy.

Example 9

For the purpose of confirming that the ferroboron and the mother alloy for an iron-base amorphous alloy produced by the method according to the present invention were suitable for producing an iron-base amorphous alloy, an amorphous alloy was produced from a mother alloy through a rapid-cooling solidification process.

The mother alloy FeB-A9-O-A in Table 10 obtained in Example 8 was remelted and a thin strip was produced by rapidly cooling and solidifying the molten mother alloy using a single-roll method. Then, the magnetic properties of the thin strip as a material for an iron core were evaluated. As a result of analyzing the chemical composition of the thin strip, the chemical composition did not deviate from that of the mother alloy. Note that, in the case where the chemical composition of the mother alloy was adjusted by further adding auxiliary materials at the time of the remelting, too, the same chemical composition as that intended for the blend of the raw materials was obtained.

In the evaluation of magnetic properties, the thin strip was cut in a length of 120 mm, annealed at 360° C. for one hour in a nitrogen atmosphere while a magnetic field was imposed thereto, and then $B_{80}$ and core loss were measured using a single sheet magnetic tester (SST). Here, $B_{80}$ was the maximum magnetic flux density when the maximum applied magnetic field was 80 A/n, and the core loss was measured when the maximum magnetic flux density was 1.3 T. The frequency at the measurement was 50 Hz.

As a result of the measurement, a high magnetic flux density of $B_{80}$=1.44 T was realized and the core loss was as low as 0.063 W/kg and, thus, the thin strips proved to have excellent alternate current soft magnetic properties and to be applicable sufficiently to actual use.

TABLE 6

| Steel | Component (mass %) | | | | | | | |
|---|---|---|---|---|---|---|---|---|
| | Fe | C | Si | Mn | P | S | T.Al | Ti |
| A | Bal. | 0.0033 | 0.7660 | 0.2550 | 0.0334 | 0.0051 | 0.0040 | 0.0003 |
| B | Bal. | 0.0026 | 0.0050 | 0.4300 | 0.0120 | 0.0190 | 0.0010 | 0.0003 |
| C | Bal. | 0.0010 | 0.0100 | 0.1000 | 0.0050 | 0.0050 | 0.0300 | 0.0300 |
| D | Bal. | 0.0040 | 0.0040 | 0.3400 | 0.0160 | 0.0080 | 0.0010 | 0.0004 |

TABLE 7

| Ferroboron | Base iron | Component (mass %) | | | | | | | | |
|---|---|---|---|---|---|---|---|---|---|---|
| | | Fe | B | C | Si | Mn | P | S | T.Al | Ti |
| FeB-A | A | Bal | 15.3 | 0.3500 | 0.8580 | 0.2400 | 0.0350 | 0.0090 | 0.0230 | 0.0060 |
| FeB-B | B | Bal | 15.5 | 0.3300 | 0.3500 | 0.4500 | 0.0180 | 0.0220 | 0.0240 | 0.0050 |
| FeB-C | C | Bal | 15.1 | 0.3700 | 0.4500 | 0.1800 | 0.0150 | 0.0070 | 0.0290 | 0.0310 |
| FeB-D | D | Bal | 15.7 | 0.3200 | 0.4200 | 0.3900 | 0.0240 | 0.0140 | 0.0240 | 0.0080 |
| FeB-A9 | A | Bal | 9.2 | 0.6500 | 0.8350 | 0.2100 | 0.0250 | 0.0080 | 0.0220 | 0.0050 |
| FeB-B9 | B | Bal | 8.7 | 0.7000 | 0.3400 | 0.4300 | 0.0140 | 0.0210 | 0.0230 | 0.0050 |
| FeB-C9 | C | Bal | 9.1 | 0.6600 | 0.4600 | 0.1500 | 0.0130 | 0.0070 | 0.0290 | 0.0290 |
| FeB-D9 | D | Bal | 8.6 | 0.7400 | 0.4300 | 0.3600 | 0.0230 | 0.0120 | 0.0230 | 0.0070 |

TABLE 8

| Ferroboron | Base iron | Component (mass %) | | | | | | | | |
|---|---|---|---|---|---|---|---|---|---|---|
| | | Fe | B | C | Si | Mn | P | S | T.Al | Ti |
| FeB-A-0 | A | Bal | 15.4 | 0.0500 | 0.8450 | 0.2300 | 0.0290 | 0.0060 | 0.0080 | 0.0030 |
| FeB-B-0 | B | Bal | 15.3 | 0.0600 | 0.3420 | 0.4600 | 0.0170 | 0.0180 | 0.0120 | 0.0040 |
| FeB-C-0 | C | Bal | 15.4 | 0.0700 | 0.4200 | 0.2000 | 0.0150 | 0.0070 | 0.0090 | 0.0140 |
| FeB-D-0 | D | Bal | 15.6 | 0.0600 | 0.4120 | 0.4200 | 0.0220 | 0.0120 | 0.0100 | 0.0040 |
| FeB-A9-0 | A | Bal | 9.1 | 0.0800 | 0.8240 | 0.1700 | 0.0240 | 0.0070 | 0.0070 | 0.0030 |
| FeB-B9-0 | B | Bal | 8.8 | 0.0600 | 0.3260 | 0.3900 | 0.0120 | 0.0180 | 0.0090 | 0.0040 |
| FeB-C9-0 | C | Bal | 8.9 | 0.0700 | 0.4460 | 0.1800 | 0.0110 | 0.0060 | 0.0080 | 0.0090 |
| FeB-D9-0 | D | Bal | 8.7 | 0.0500 | 0.4200 | 0.3200 | 0.0180 | 0.0090 | 0.0070 | 0.0050 |

TABLE 9

| | Compounding ratio (in mass) | |
|---|---|---|
| Raw material | Mother alloy FeB-A9-0-A | Mother alloy FeB-A9-0-C |
| FeB-A9-0 | 1560 | 1560 |
| Diluent base iron | 5035 | 4990 |
| FeP | 3295 | 3305 |
| Carbon material | 18.3 | 18.4 |
| Si | 89.9 | 128 |

TABLE 10

| Mother alloy | Component (mass %) | | | | | | | |
|---|---|---|---|---|---|---|---|---|
| | Fe | B | C | Si | Mn | P | S | T.Al | Ti |
| FeB-A9-0-A | Bal | 1.4200 | 0.2400 | 1.4200 | 0.1450 | 5.9500 | 0.0050 | 0.0034 | 0.0009 |
| FeB-A9-0-C | Bal | 1.4200 | 0.2400 | 1.4200 | 0.0820 | 5.9600 | 0.0050 | 0.0160 | 0.0160 |

Example 10

Each of the two kinds of base irons shown in Table 11, boron oxide and a carbon-base reducing agent were melted in an electric furnace and ferroboron was produced. Each of the base irons was the steel produced by subjecting pig iron obtained through a blast furnace to a desulfurizing process, a desiliconizing process and then a dephosphorizing and decarburizing process wherein oxygen blowing was applied in a converter. Steel A was deoxidized with Si and Mn, and steel B with Mn. Each of the steels was cast into a steel slab through continuous casting, thereafter the steel slab was hot-rolled to a hot-rolled coil about 3 mm in thickness, and then steel pieces cut out from the hot-rolled coil in the size of several centimeters square using a shear were used as the base iron.

As the electric furnace, a 3-phase Héroult electric furnace having an electric capacity of 600 kVA was used. The furnace was continuously operated for four days, during which the base irons were changed every other day in the sequence of steels B and A. The tapping interval was about two hours and the ferroboron tapped at the timing not influenced by the switching of the base irons was subjected to analysis. With regard to the blend of the raw materials, the initial blend shown in Table 12 was adopted at the start of the furnace operation and, at the time when the furnace operation was stabilized, the blend was switched to the stable state blend shown in the same table.

The analysis values of the ferroboron thus produced are shown in Table 13. In any of the ferroboron produced by using steels A and B as the base irons, the Al content was 0.024 mass % or less and the Ti content was 0.008 mass % or less, and thus the purity thereof was high enough for the application to an amorphous alloy. The analysis values of Al and Ti in the ferroboron were higher than those in the steels as the base irons shown in Table 11. This is due to the contamination from the boron oxide and the reducing agent. Note that "T. Al" in the tables represents the total amount of metallic Al and compound Al.

Example 11

Each of the ferroboron shown in Table 13 obtained in Example 10, a diluent base iron, and, as auxiliary materials, FeP, a carbon material and Si were melted in a high-frequency induction furnace and a mother alloy for an iron-base amorphous alloy was produced. Each of the ferroboron was used after crushing that tapped and then solidified in Example 10.

Steel pieces cut out from the steels shown in Table 11 in the same way as in Example 10 were used as the diluent base irons.

The raw materials were blended so that the main chemical components of a mother alloy would conform to prescribed values, heated until they were melted completely in a high-frequency induction furnace, and held therein until the mixture became homogeneous. Then, the mixture was solidified and crushed, and a part of it was sampled for analysis.

An example of a material blend in the case where ferroboron FeB-A in Table 13 was used as a raw material and steel A in Table 11 as the diluent base iron (combination A-A) is shown in Table 14. The analysis values of the components of the mother alloy A-A obtained in the example of the blend are shown in Table 15. It was confirmed that the analysis values of the main components in Table 15 were little deviated from respective prescribed values defined beforehand and that the same chemical composition as that intended for the blend of the raw materials was obtained.

In the mother alloy A-A shown in Table 15, the contents of Al and Ti were low, and thus the mother alloy was suitable as a raw material for an iron-base amorphous alloy. Further, in the case of the combination B-A where ferroboron FeB-B was used as a raw material and steel A as the diluent base iron, too, the mother alloy having the Al and Ti contents suitable for an iron-base amorphous alloy was obtained.

Further, in the combinations A-B and B-B where steel B was used as the diluent base irons, the Al content in each of the mother alloys was 0.0050 mass % or less, and thus each of the alloys was suitable as a mother alloy for an iron-base amorphous alloy.

Example 12

The mother alloy A-A obtained in Example 11 was remelted and a thin strip was produced by rapidly cooling and solidifying the molten mother alloy using a single-roll method. Then, the magnetic properties of the thin strip as a material for an iron core were evaluated. As a result of analyzing the chemical composition of the thin strip, the chemical composition did not deviate from that of the mother alloy. Note that, in the case where the chemical composition of the mother alloy was adjusted by further adding auxiliary materials at the time of the remelting, too, the same chemical composition as that intended for the blend of the raw materials was obtained.

In the evaluation of magnetic properties, the thin strip was cut in a length of 120 mm, annealed at 360° C. for one hour in a nitrogen atmosphere while a magnetic field was imposed thereto, and then $B_{80}$ and core loss were measured using a single sheet magnetic tester (SST). Here, $B_{80}$ was the maximum magnetic flux density when the maximum applied magnetic field was 80 A/m, and the core loss was measured when the maximum magnetic flux density was 1.3 T. The frequency at the measurement was 50 Hz.

As a result of the measurement, a high magnetic flux density of $B_{80}$=1.44 T was realized and the core loss was as low as 0.063 W/kg, and, thus, the thin strip proved to have excellent alternate current soft magnetic properties and to be applicable sufficiently to actual use.

TABLE 11

| Steel | Component (mass %) | | | | | | | |
|---|---|---|---|---|---|---|---|---|
| | Fe | C | Si | Mn | P | S | T.Al | Ti |
| A | Bal. | 0.0033 | 0.7660 | 0.2550 | 0.0334 | 0.0051 | 0.0040 | 0.0003 |
| B | Bal. | 0.0040 | 0.0040 | 0.3400 | 0.0160 | 0.0080 | 0.0010 | 0.0004 |

TABLE 12

| Raw material | Compounding ratio (in mass) | |
|---|---|---|
| | Initial | Stable state |
| Boron oxide | 657 | 657 |
| Base iron | 820 | 820 |
| Charcoal | 190 | 368 |
| Lime | 84 | 67 |
| Metallurgical coke | 214 | — |

TABLE 13

| Ferroboron | Base iron | Component (mass %) | | | | | | | | |
|---|---|---|---|---|---|---|---|---|---|---|
| | | Fe | B | C | Si | Mn | P | S | T.Al | Ti |
| FeB-A | A | Bal | 15.3 | 0.3500 | 0.8580 | 0.2400 | 0.0350 | 0.0090 | 0.0230 | 0.0060 |
| FeB-B | B | Bal | 15.7 | 0.3200 | 0.4200 | 0.3900 | 0.0240 | 0.0140 | 0.0240 | 0.0080 |

TABLE 14

| Raw material | Compounding ratio (in mass) Mother alloy FeB-A9-0-A |
|---|---|
| FeB-A | 929 |
| Diluent base iron (steel A) | 5665 |
| FeP | 3300 |
| Carbon material | 16.5 |
| Si | 90.2 |

TABLE 15

| Mother alloy | Component (mass %) | | | | | | | |
|---|---|---|---|---|---|---|---|---|
| | Fe | B | C | Si | Mn | P | S | T.Al | Ti |
| A-A | Bal | 1.4200 | 0.2450 | 1.4200 | 0.1550 | 5.9600 | 0.0050 | 0.0047 | 0.0011 |

The invention claimed is:

1. High-purity ferroboron for amorphous alloy, characterized by consisting of:
   P: 0.02 mass % or more,
   Al: 0.009% to 0.03 mass
   Ti of 0.004 to 0.03 mass
   B of 10% or more,
with the balance being Fe, C, Si, Mn, S, and unavoidable impurities.

2. High-purity ferroboron for amorphous alloy characterized by consisting essentially of:
   P: 0.02 mass % or more,
   Al: 0.009% to 0.03 mass %, and
   Ti of 0.004 to 0.03 mass %,
   B of 10% or more,
with the balance being Fe, and unavoidable impurities.

* * * * *